United States Patent [19]
Pyle

[11] Patent Number: 4,719,823
[45] Date of Patent: Jan. 19, 1988

[54] CHAIN SAW SHARPENING GUIDE

[76] Inventor: Jack D. Pyle, 19-K Evergreen Dr., Hertford, N.C. 27944

[21] Appl. No.: 816,227

[22] Filed: Jan. 6, 1986

[51] Int. Cl.⁴ .................... B23D 63/10; B23D 63/16
[52] U.S. Cl. ......................................... 76/36; 33/202
[58] Field of Search ................. 76/25 A, 36; 33/202

[56] References Cited

U.S. PATENT DOCUMENTS

| | | | |
|---|---|---|---|
| 3,055,115 | 9/1962 | Tyrrell | 33/202 |
| 3,091,136 | 5/1963 | Maier | 76/36 |
| 3,942,255 | 3/1976 | Bakoledis | 76/36 |
| 4,429,596 | 2/1984 | Southard | 76/36 |

Primary Examiner—Roscoe V. Parker

[57] ABSTRACT

A sharpening guide for a chain saw with a vertical longitudinal channel which is placed on a saw chain and saw bar in a straddling position enabling the guide to move along the chain and bar while filing right hand and left hand cutters. The guide includes two transverse channels; six fixed transverse filing angles consisting of 30, 35 and 40 degrees with file and guide alignment lines; four 10 degree pitch filing angles; a detachable spacer to eliminate saw chain side movement or wobble; and an alignment and locking mechanism consisting of three adjustable bolts which holds the guide squarely and firmly in place allowing the operator to use both hands when filing cutters.

3 Claims, 14 Drawing Figures

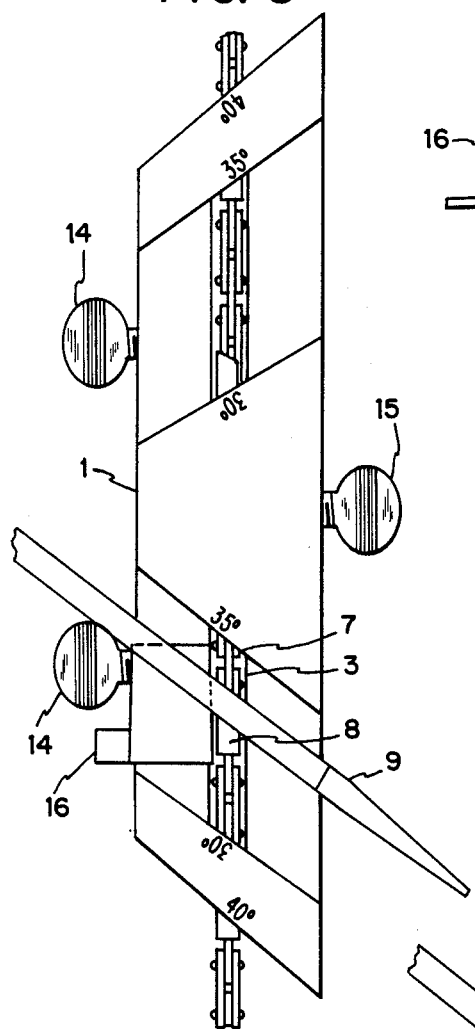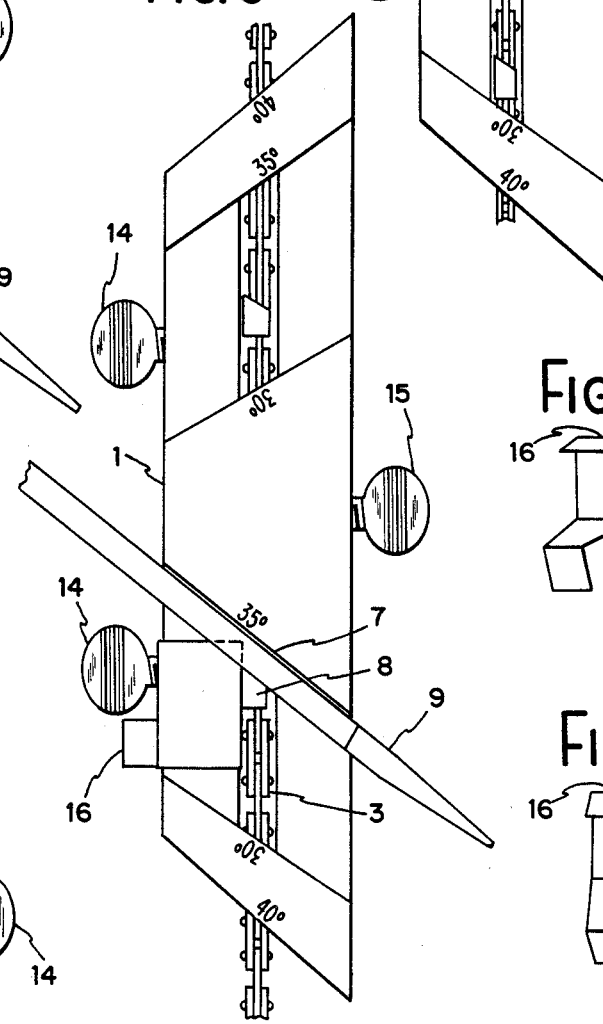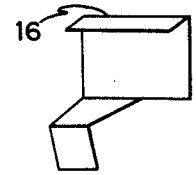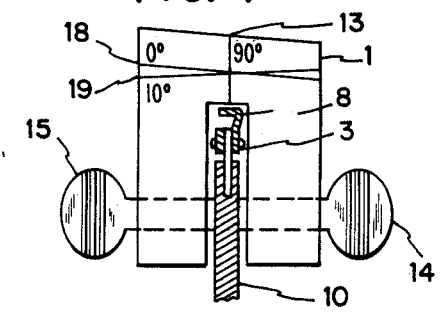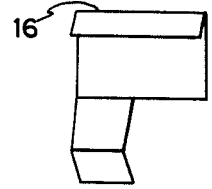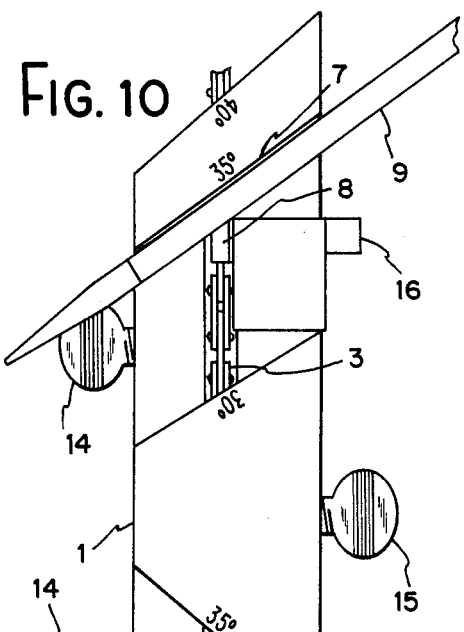

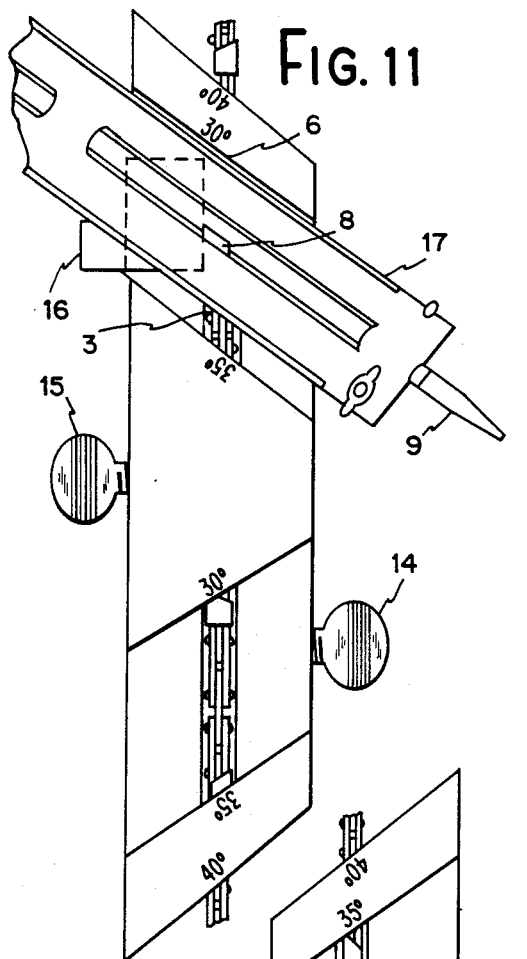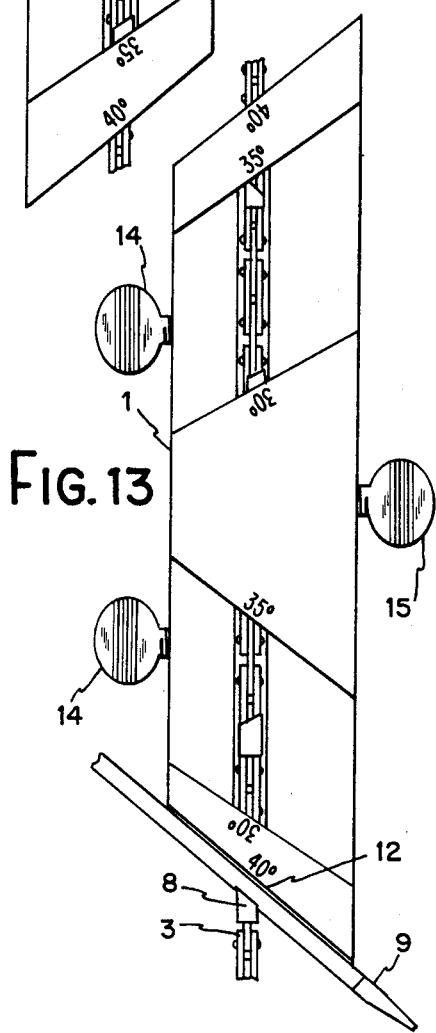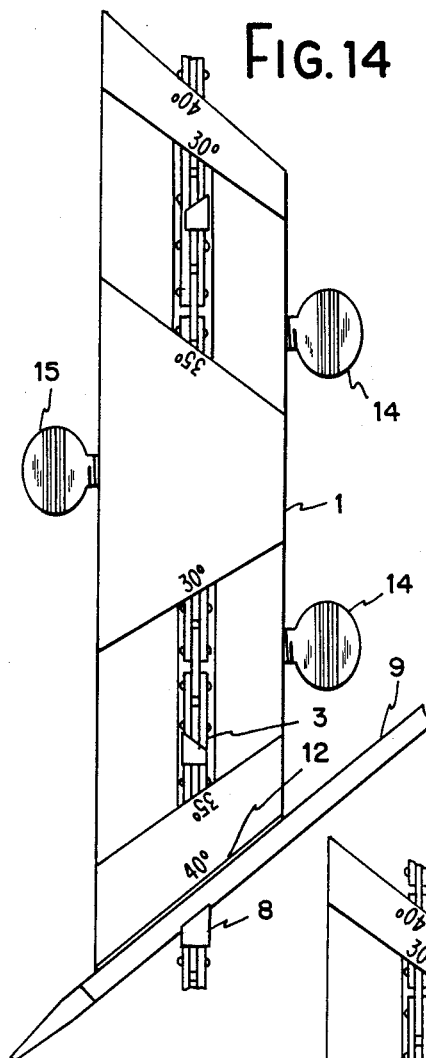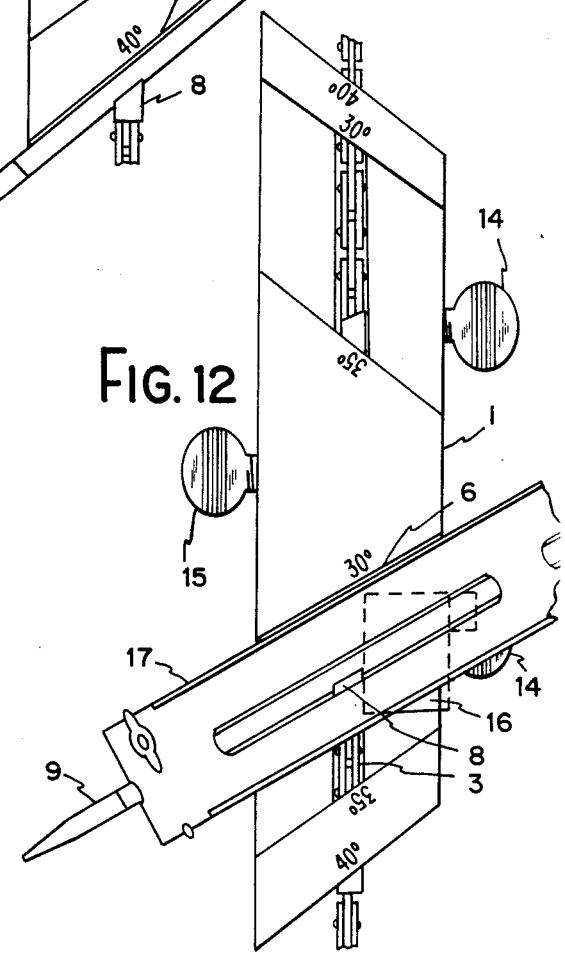

CHAIN SAW SHARPENING GUIDE

BACKGROUND OF THE INVENTION

This invention provides for the sharpening of chain saw cutter situated on a saw chain with a round file or file holder without removing the saw chain from the saw bar. During normal use chain saw cutters become dull and frequently require resharpening. Accuracy and sometimes speed in sharpening is essential.

During cutting operation this endless saw chain is pulled along an elongated chain saw bar in a circular manner by a chain saw sprocket and saw chain teeth. The saw chain includes alternate right hand and left hand cutters spaced about 1⅜ inches apart and situated slightly off center. The standard saw chain has an outside width of about 5/32 of an inch. With rivet heads the width is about 3/16 of an inch. The right hand and left hand cutters extend outward beyond the chain approximately 1/16 of an inch each. The saw chain includes a center link of teeth for pulling which extend into a groove in the saw bar. These teeth are slightly less than 1/16 of an inch in width, and the saw groove is slightly more than 1/16 of an inch in width. The outside width of the saw bar is approximately 5/32 of an inch. The saw cutters have a top plate horizontal cutting edge, and a side plate vertical cutting edge. The filing angles of these cutters recommended by manufacturers is usually 30 degrees or 35 degrees, with some cutters requiring an upward pitch of 10 degrees. Occasionally, some operators like to file cutters to 40 degree angles. The round file sizes recommended by manufacturers of saw chains are either 5/32, 3/16, or 7/32 of an inch in diameter.

SUMMARY OF THE INVENTION

The object of this invention is to provide a new fixed angle chain saw sharpening guide which is accurate, small, lightweight, simple to operate, and easy to attach, align and remove from the chain saw bar and chain when working either in the shop or out of doors. Deficiencies noted in other chain saw filing guides are that they are either cumbersome, difficult to operate, unsteady, or will allow the saw chain to wobble causing cutters to be beveled when filed. This U-shaped guide with its two horizontal transverse channels and six fixed filing angles will allow the operator to sharpen his chain saw cutters with an round file or file holder accurately and quickly to either 30, 35 or 40 degrees, and with a 10 degree upward pitch if necessary, without removing the saw chain from the saw bar. The filing of the top plate and side plate cutter edges for 30, 35 and 40 degree angles, and the 10 degree upward pitch filing, is accomplished in one combined filing. The use of the spacer in the longitudinal channel between the guide and the saw chain eliminates saw chain side movement. The method of attaching the guide to the saw bar with three adjustable bolts assures positive alignment and secure attachment which permits the operator to use both hands for easier and more accurate filing.

BRIEF DESCRIPTION OF THE DRAWINGS

FIG. 4 is an end view of the chain saw sharpening guide showing how the guide straddles the saw chain and bar, and how the adjustable bolts clamp the guide to the saw bar and saw chain below the level of the saw chain.

FIGS. 5, 6, and 7 are perspective views of the spacer which is placed between the saw chain and guide to eliminate side movements while filing cutter.s FIG. 8 is a top view of the chain saw sharpening guide with the spacer in place and the round file on the chain against a cutter before the guide is moved back locking the file in filing position next to the 35 degree fixed filing angle.

FIG. 9 is a top view of the chain saw sharpening guide with the spacer in place and the file in filing position next to the 35 degree fixed filing angle for filing left hand cutters from the right side of the saw.

FIG. 10 is a top view of the chain saw sharpening guide with the spacer in place and the file in filing position next to the 35 degree fixed filing angle for filing right hand cutters from the left side of the saw.

FIG. 11 is a top view of the chain saw sharpening guide with the spacer in place and a flat rectangular shaped round file holder with file in filing position next to the 30 degree fixed filing angle for filing left hand cutters from the right side of the saw.

FIG. 12 is a top view of the chain saw sharpening guide with the spacer in place and retangular shaped round file holder with file in filing position next to the 30 degree fixed filing angle for filing right hand cutters from this left side of the saw.

FIG. 13 is a top view of the chain saw sharpening guide with the file in filing position next to the 40 degree fixed filing angle for filing left hand cutters from the right side of the saw.

FIG. 14 is a top view of the chain saw sharpening guide with the file in filing position next to the 40 degree fixed filing angle for filing right hand cutters from the left side of the saw.

DETAILED DESCRIPTION OF THE INVENTION

Figure 1:
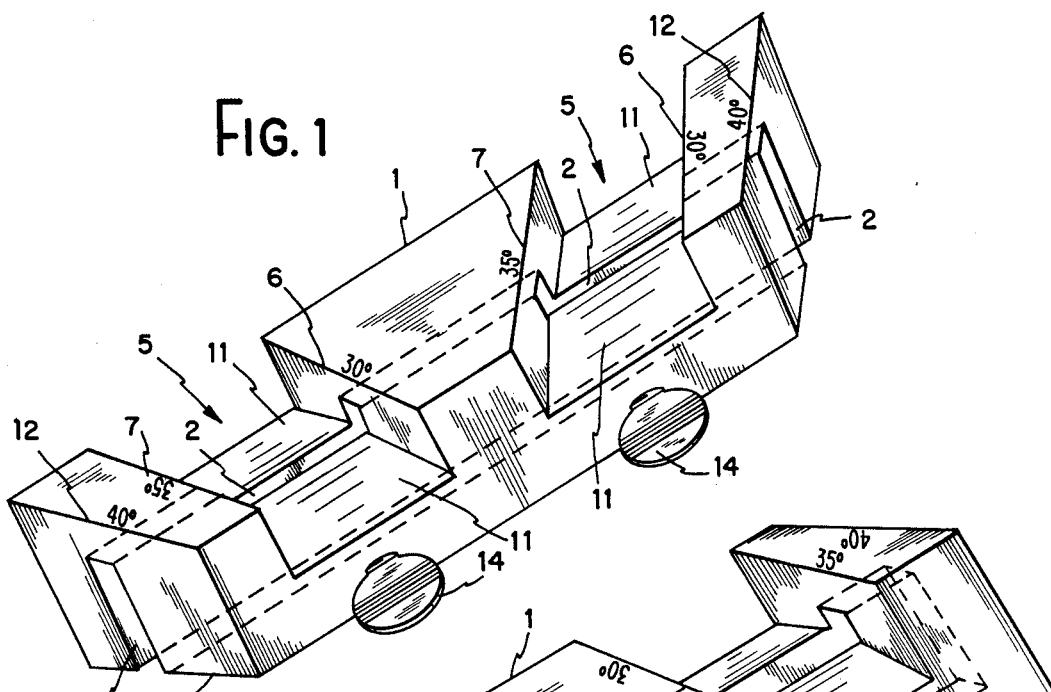
FIG. 1 represents a perspective view of the chain saw sharpening guide from the side with the two adjustable alignment bolts 14.
Figure 2:
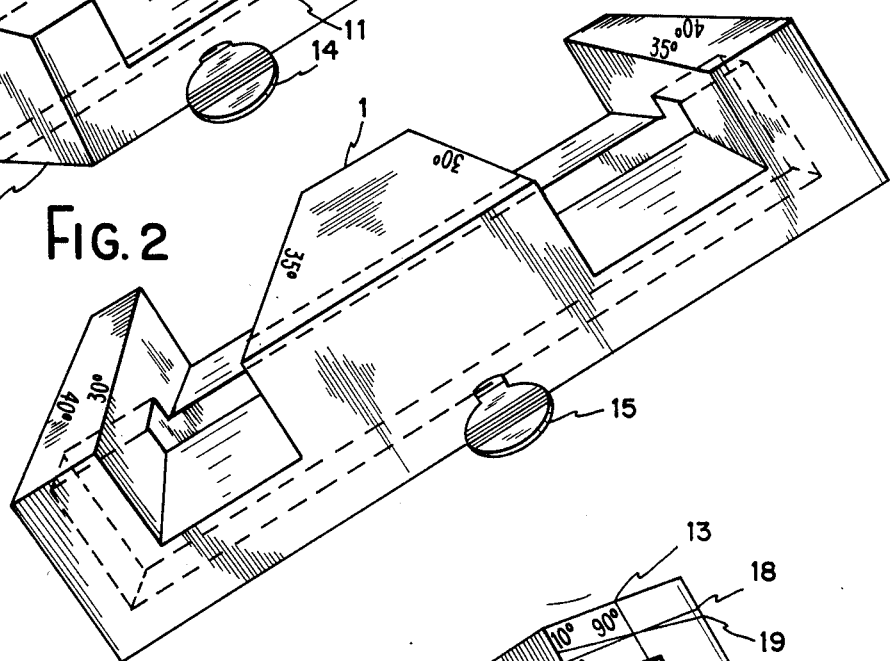
FIG. 2 represents a perspective view of the chain saw sharpening guide from the side with the one adjustable locking bolt 15.
Figure 3:
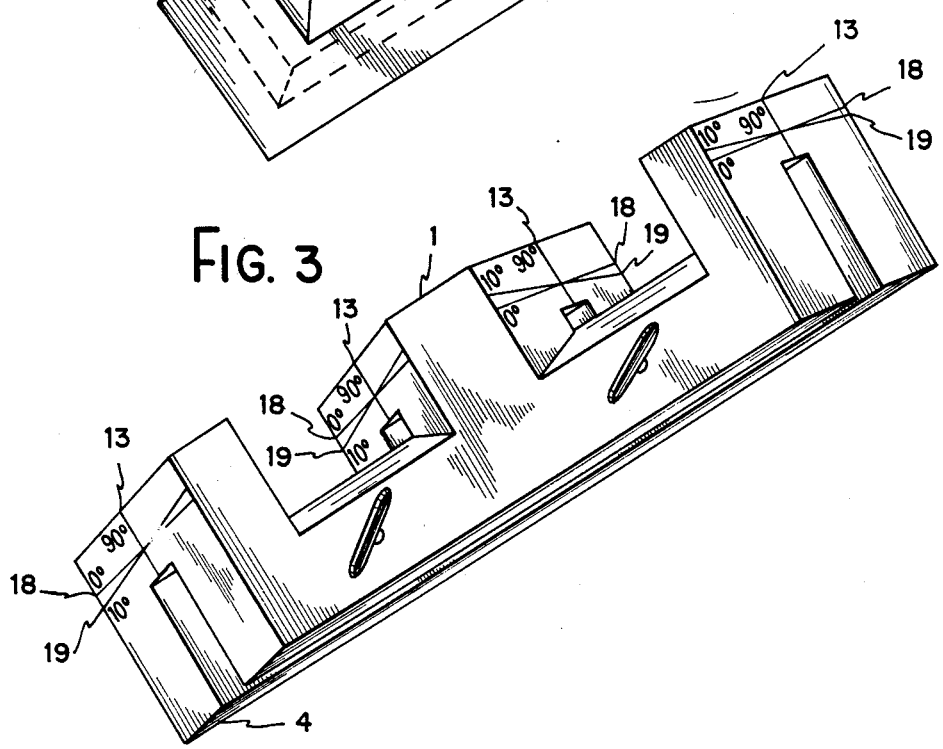
FIG. 3 represents a perspective view of the chain saw sharpening guide showing the guide and file alignment lines, and the bottom of the guide.

The subject chain saw sharpening guide 1 is a solid one piece unit 8 inches long, 1½ inches wide, and 2 inches high, with a 5/16 inch wide vertical longitudinal channel 2 running the length of the guide 1. This channel 2 is 1⅜ inches in height measured from the base 4. This guide 1 has two horizontal transverse channels 5, 1½ inches or more in width and 15/16 of an inch deep in the center section. These dimensions will vary for different size saw chains 3. Both of these two channels 5 have a combination of 30 and 35 degree fixed filing angles surface 6, 7, so arranged that the filing of cutters 8 to 30 or 35 degrees can be accomplished with the file 9 in a locked in position between the cutters' 8 cutting edge and fixed filing angle surfaces 6, 7, and that all cutters 8 on the saw chain 3 can be sharpened without removing the guide 1 from the saw chain 3 and saw bar 10. Also, the two transverse channels 5 include four 10 degree upward pitch angle surfaces 11 on the bottom. Both ends of the guide 1 have opposite 40 degree filing angle surfaces 12. All six fixed filing angle surfaces 6, 7, 12, include vertical 13, horizontal 18, and 10 degree file alignment lines 19. One side of the guide 1 has two ¼ inch adjustable bolts 14, ¾ of an inch long for aligning the guide 1 with the saw chain 3 and saw bar 10. The opposite side of this guide 1 has one ¼ inch adjustable bolt 15 one inch long for locking the guide 1 on the saw chain 3 and saw bar 10. When filing cutters 8 to either 30 or 35 degrees angles 6, 7, a separate spacer 16 1/16 inches thick is placed in the longitudinal channel 5 between the guide 1 and the saw chain 3 to prevent side movement of the saw chain 3. The 3/16 inch wide saw chain 3 and the 1/16 of an inch thick spacer 16 allows about 1/16 of an inch clearance between the guide 1 and the saw chain 3 in the 5/16 inch wide longitudinal channel 2 for movement of the guide 1 along the saw chain 3.

The subject chain saw sharpening guide 1 can be manufactured by injection molding of a hard plastic material such as Lexan or Polyurethane, or it can be made of molded or machined metal. The spacer 16 can be made of plastic or sheet metal. The adjustable bolts are standard items.

Before using the guide 1 for sharpening, adjust the saw chain 3 tension so that the saw chain 3 is snug on the saw bar 10 but loose enough to be pulled around the saw bar 10 by hand. Then with the adjustable bolts 14, 15, backed out clear of the longitudinal channel 2 place the guide 1 on the saw chain 3 and saw bar 10 in a straddling position resting on the top of the saw chain 3 and cutters 8. Next adjust the two alignment bolts 14 and the one locking bolt 15 so that the guide 1 is centered on the saw chain 3 and saw bar 10 using the vertical or 90 degree lines 13. After centering guide 1, loosen locking bolt 15 so that guide 1 can be moved along saw chain 3 and saw bar 10. Now move guide 1 so that filing angle surface 6 or 7 is near cutter 8 to be sharpened as shown in FIG. 8. Place spacer 16 in longitudinal channel 2 between guide 1 and saw chain 3. Place proper size file 9 across saw chain 3 to cutters' cutting surface 8. Move guide 1 back along saw chain 3 and saw bar 10 which moves file 9 in place between fixed filing angle 6 or 7 and cutter 8 surface to be filed as shown in FIG. 9. Holding the file 9 in place with one hand tighten locking bolt 15 with the other hand locking the guide 1 and file 9 in place on the saw chain 3 and saw bar 10. With the file 9 locked in place between the cutter 8 and the fixed filing angle 6 or 7 there should be a slight amount of clearance allowed between the file 9 and the filing angle 6 or 7 for file 9 movement except when using the flat file holder 17. Since the flat file holder 17 has a smooth edge, it can rest solidly against the filing angle. With the file 9 at the selected filing angle 6 or 7, and aligned with either the horizontal lien 18 or 10 degree upward pitch guides 11, 19, file the cutters' 8 top and side plate edges with even strokes and even pressure toward the outside edge of the cutter 8 at the end of the stroke release pressure on the cutter 8 and pull back for the next stroke. When filing, all pressure should be on the cutter 8 surface, and none on the filing angle 6 or 7 surface. After cutter 8 has been sharpened, loosen the locking bolt 15, move guide 1 slightly away from the file 9, remove fil 9, and repeat the foregoing steps for sharpening the next cutter 8. It is not necessary to readjust the alignment bolts 14 because the alignment of the guide 1 is set for sharpening all cutters 8. Sharpen all cutters 8 on one side of the chain 3 before sharpening cutters 8 on the other side of the chain 3. The method of locking the file 9 in place between the cutter 8 and fixed angle 6, 7, assures tight file 9 alignment control and prevents beveling, hook or backslope filing of the cutter 8. For 30 and 35 degree 6,7, sharpening, the guide 1 does not need to be removed from the saw chain 3 and saw bar 10. For 40 degree 12 sharpening, the guide 1 requires reversing in order to sharpen both right hand and left hand cutters 8.

The specific embodiment of this invention is the arrangement of the two horizontal transverse channels 5 with fixed filing angles for 30 degrees at surface 6 and 35 degrees at surface 7 in the same channel 5 so arranged as to position the file 9 between the desired filing angle surface 6 or 7 and the cutting surface of the cutter 8, allowing the operator to sharpen his chain saw cutters 8 with either a round file 9, or a round file holder accurately and quickly to either 30 or 35 degrees, and in combination with a 10 degree upward pitch if desired, without removing the saw chain 3 from the saw bar 10.

Two embodiments of this invention to which I claim are defined as follows:

1. A multiple use saw chain sharpening guide for sharpening both right and left-hand cutter blades incorporated on a saw chain mounted on a chain saw bar to either 30 degrees, 35 degrees, or 40 degrees, and with a combined 10 degree upward pitch if desired, consisting of a light-weight hand operated, elongated and inverted U-shaped one piece member, said sharpening guide includes a vertical, longitudinal, continuous channel through said member for placing the sharpening guide on the saw chain and saw bar enabling the sharpening guide to move along the saw chain and saw bar while filing cutter blades, said vertical, longitudinal, continuous channel being deep enough and wide enough to permit the free movement of the saw chain with cutter blades, said sharpening guide includes two horizontal transverse channels oppositely situated on the upper part of said sharpening guide that are wide enough to permit the use of a round file, or round file holder with file, and deep enough to accommodate a saw chain with cutter blades extending above the bottom level allowing adequate clearance for the transverse reciprocating movement of a round file, or round file holder with file, said horizontal transverse channels each having 30 degree and 35 degree opposing vertical filing angle alignment surfaces and 10 degree upward pitch alignment surfaces, said sharpening guide includes two 40 degree vertical filing angle surfaces oppositely situated on the guide end faces, said sharpening guide's vertical filing angle alignment surfaces for 30 degrees, 35 degrees, and 40 degrees, are all formed by surfaces of the channels or guide end faces, said sharpening guide's vertical filing angle alignment surfaces are all appropriately numbered on the top part of th sharpening guide next to the proper filing angle, said sharpening guide's vertical filing angle alignment surfaces all include a vertical 90 degree, a horizontal 0 degree, and a slanted 10 degree upward pitch filing angle alignment line, said sharpening guide includes a saw chain sharpening guide alignment and locking means consisting of three hand operated flat headed adjustable bolts which hold the sharpening guide squarely and firmly in place on the saw chain and saw bar, said sharpening guide alignment and said locking bolts, with threaded bolt holes are located with two horizontal bolts and threaded bolt holes adequately spaced on a horizontal plane parallel with the longitudinal axis and perpendicular to the vertical, longitudinal, continuous channel on the short side of the sharpening guide, and one horizontal bolt and threaded bolt hole located slightly off center and perpendicular to the vertical, longitudinal, continuous channel on the opposite side of the sharpening guide, said threaded bolts when tightened, contact the saw bar below the level of the saw chain and saw bar track; a separate spacer is included for use with the sharpening guide to eliminate saw chain side movement or saw chain wobble when filing cutter blades to 30 degrees, or 35 degrees, said spacer is irregular in shape with a flat vertical surface for inserting in the space between the saw chain cutter blade and the inside wall of the vertical, longitudinal, continuous channel, said spacer includes a flat 10 degree angled surface which rests on the slanted 10 degree upward pitch filing guide alignment surface in the horizontal transverse channels, said spacer also includes a horizontal flat surfaced tab for inserting and removing the spacer.

2. A multiple use saw chain sharpening guide as described in claim 1, wherein, said channels each having separate 30 degree and 35 degree opposing vertical filing angle alignment surfaces, and with the two said channels having a particular or unique combined vertical filing angle alignment surface arrangement in sequence along said sharpening guide beginning at an outer most vertical channel filing angle alignment surface, of 30 degrees, 35 degrees, 30 degrees, and 35 degrees, or in the reverse order beginning at the same outer most vertical channel filing angle alignment surface, of 35 degrees, 30 degrees, 35 degrees, and 30 degrees, whereby the position of the single round file, or round file in the file holder is placed between the desired filing angle surface and the cutting surface of the saw chain cutter blade when filing cutters thereby making it possible to sharpen both right-hand and left-hand cutter blades to both 30 degrees and 35 degrees, with a combined 10 degree upward pitch if necessary, without removing the sharpening guide from the saw chain and saw bar.

3. A multiple use saw chain sharpening guide as described in claim 1, or 2, wherein each horizontal transverse channel has a slanted 10 degree upward and inward pitch filing angle alignment surface the full width of each bottom side entrance formed by surfaces of the horizontal transverse channels.

* * * * *